United States Patent [19]

Fernald

[11] 4,063,232

[45] Dec. 13, 1977

[54] SYSTEM FOR IMPROVING THE RESOLUTION OF ALPHA-NUMERIC CHARACTERS DISPLAYED ON A CATHODE RAY TUBE

[76] Inventor: Olaf H. Fernald, 44 Hundreds Circle, Wellesley Hills, Mass. 02181

[21] Appl. No.: 368,116

[22] Filed: June 8, 1973

Related U.S. Application Data

[63] Continuation of Ser. No. 216,977, Jan. 11, 1972, abandoned, which is a continuation-in-part of Ser. No. 46,066, June 15, 1970, abandoned.

[51] Int. Cl.$^2$ .................................................. G06F 3/14

[52] U.S. Cl. ................................ 340/324 AD; 178/30; 358/134

[58] Field of Search .................. 340/324 AD; 178/30, 178/DIG. 3; 358/134, 138

[56] References Cited

U.S. PATENT DOCUMENTS

| | | | |
|---|---|---|---|
| 3,426,344 | 2/1969 | Clark | 340/324 AD |
| 3,573,789 | 4/1971 | Sharp et al. | 340/324 AD |

*Primary Examiner*—Marshall M. Curtis
*Attorney, Agent, or Firm*—Morse, Altman, Oates & Bello

[57] ABSTRACT

A system is provided for displaying alpha-numerical data on a cathode ray tube. A flicker-free, high resolution display is achieved by a repeating raster field displaced slightly from one another. This is achieved in one approach by using a modified repeat field technique in a 10 × 14 display and an associated 10 × 14 memory for each letter. Another approach employs a 5 × 7 memory in conjunction with logic circuitry producing a resolution equivalent to a 10 × 14 display by means of fillets generated at selected portions of the characters. The shape of individual characters is improved by selectively removing fillets from square corners of the character by using the presence of a black or illuminated area to inhibit the use of a fillet.

3 Claims, 11 Drawing Figures

CHARACTER CODE WORD
REGISTER
READ ONLY MEMORY
"C—D" REGISTER
"A—B" REGISTER
TIMING SIGNAL
RANDOM ACCESS MEMORY
CHARACTER ADDRESS
TIMING
HORIZ. CHAR. NO.
VERT. CHAR. NO.
MIXED BLANK. OUTPUT
MODE F.F.
HORIZ. SYNC. F.F.
HORIZ. BLANK. F.F.
VERT. SYNC. F.F.
VERT. BLANK. F.F.
FIELD COUNT F.F.
MASTER CLOCK PULSE GEN.
HORIZONTAL COUNTER
VERTICAL COUNTER
COMBINER
MASTER CLOCK
A+BC̄D̄
Ā

| BINARY | EVEN FIELD | | AB | CD |
|---|---|---|---|---|
| 000\|0 | 0 | NOTHING | LINE 0 | (BLANK) |
| 001\|0 | 2 | REG. | LINE 1 | LINE 0 |
| 010\|0 | 4 | ——— | LINE 2 | LINE 1 |
| 011\|0 | 6 | ——— | LINE 3 | LINE 2 |
| 100\|0 | 8 | ——— | LINE 4 | LINE 3 |
| 101\|0 | 10 | ——— | LINE 5 | LINE 4 |
| 110\|0 | 12 | ——— | LINE 6 | LINE 5 |

(EVEN FIELD IS −1)

| BINARY | ODD FIELD | | AB | CD |
|---|---|---|---|---|
| 000\|1 | 1 | ——— | LINE 0 | LINE 1 |
| 001\|1 | 3 | ——— | LINE 1 | LINE 2 |
| 010\|1 | 5 | ——— | LINE 2 | LINE 3 |
| 011\|1 | 7 | ——— | LINE 3 | LINE 4 |
| 100\|1 | 9 | ——— | LINE 4 | LINE 5 |
| 101\|1 | 11 | ——— | LINE 5 | LINE 6 |
| 110\|1 | 13 | NOTHING | LINE 6 | (BLANK) |

(ODD FIELD IS +1)

SYSTEM FOR IMPROVING THE RESOLUTION OF ALPHA-NUMERIC CHARACTERS DISPLAYED ON A CATHODE RAY TUBE

CROSS-REFERENCE TO RELATED APPLICATION

This is a continuation, of application Ser. No. 216,977 filed Jan. 11, 1972, now abandoned which is a continuation-in-part of application Ser. No. 46,066 filed June 15, 1970 and now abandoned.

BACKGROUND OF THE INVENTION

1. Field of the Invention

This invention relates generally to data reproduction and more particularly is directed towards improvements in the alpha-numerical display of data on cathode ray tubes.

2. Summary of the Prior Art

Various types of computer systems employ display terminals which include cathode ray tubes on which all manner of information is displayed. Very frequently this information is in alpha-numerical form to provide data typically as to a stock quotations, account balances, inventory records or other information of this type. In general, the quality of the reproduced characters from present systems is rather poor insofar as the characters are comprised of black squares displayed in a pattern determined by the memory and driving circuitry. The characters thus displayed are rather crude in an outline and tend to be confusing, particularly with respect to other similarly shaped characters.

Accordingly, it is an object of the present invention to provide improvements in display terminals using cathode ray tubes as the display medium. A further object of this invention is to provide a display terminal wherein alpha-numerical characters will be reproduced with high resolution and low flicker for easy reading. A further object of this invention is to provide a cathode ray tube display terminal of simple, low cost design yet high in quality and flexible in operation.

SUMMARY OF THE INVENTION

This invention features a computer display terminal comprising a cathode ray tube, a memory for storing digitally coded alpha-numerical characters, a typewriter keyboard or the like for providing input data, associated control keys and associated electronic circuitry for driving and refreshing the storage, change the information within the memory and cyclically refreshing the display. The circuitry repeats the pattern in a slightly displaced overlay arrangement without causing flicker and rounds out corners of characters so as to reproduce them in sharp definition and more in correspondence with their normal shape. In one embodiment the repeat field technique uses a larger memory as a means for repeating the pattern and in another embodiment a conventional memory uses logical circuitry to produce fillets between diagonally adjacent squares that make up a character in a conventional pattern.

DETAILED DESCRIPTION OF THE PREFERRED EMBODIMENTS

Figure 1:
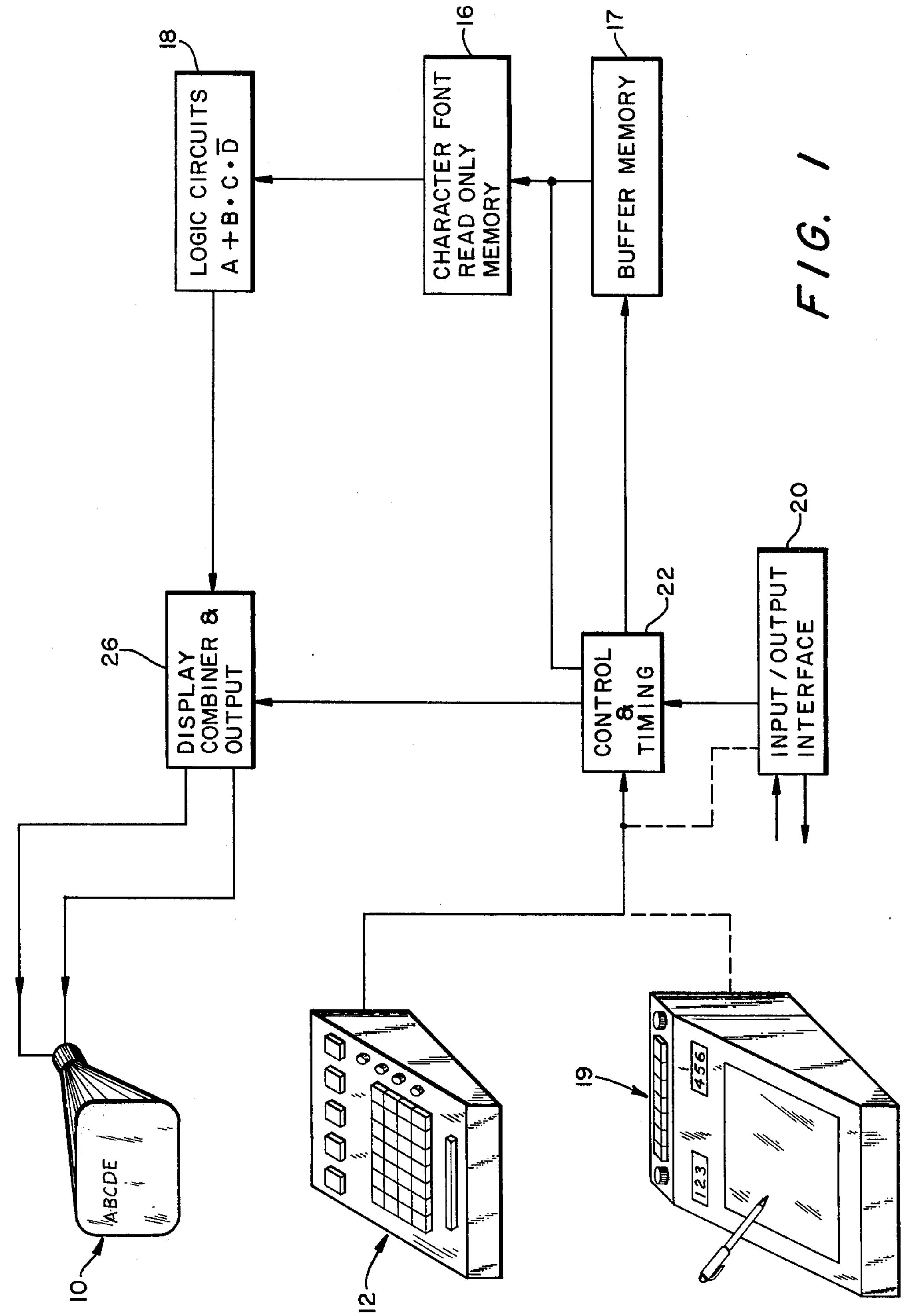
FIG. 1 is a schematic diagram of a display terminal system made according to the invention.

Referring now to FIG. 1 of the drawings, the display terminal system includes a cathode ray tube 10 adapted to display alpha-numerical data thereon, a typewriter keyboard 12 by which input data is set in to the system, associated control keys 14, a character font read-only memory 16 in which digitally encoded alpha-numerical characters are stored, a random access buffer memory 17, logic circuit 18 and the necessary associated electronic circuitry required to drive and refresh the storage and change the information within the memory. Other input terminals may be used such as a tablet as disclosed in my copending application Ser. No. 100,217 filed Dec. 21, 1970 entitled "Optical Grapic Data Tablet." Input information is fed through an input interface buffer 20 which writes the appropriate information in memory 17. The refresh operation of the display involves a control unit and a master timing clock 22 which addresses the character memory. Output of the character memory 16 is an ASCII code which is used to address the font memory. The output of the font memory synchronously feeds information for the particular dots to be illuminated in each line on the cathode ray tube 10. The outputs of the font memory are combined ("OR" ed) at a display combiner 26 and fed to the cathode ray tube 10. The storage of characters permits easy input and output of alpha-numeric data.

Figure 2:
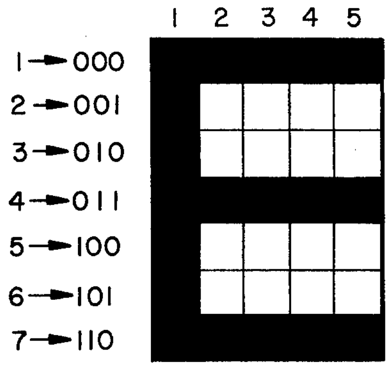
FIG. 2 is a typical 5 × 7 format for the display of the encoded latter "E,"

In a conventional display terminal using a cathode ray tube, a scanned raster is used employing character storage in some coded format such, for example, ASCII, where a binary number corresponds to a letter. Using this binary number as an address in a read-only memory together with the line number, and reading out the bits corresponding to the black ("1") or white ("0") portions of a letter, in a typical 5 × 7 format, such as shown in FIG. 2, the letter "E," for example, would have the address 1000101,000 where 1000101 is the ASCII code for "E" and 000 might designate the first line. In FIG. 2, the format comprises a defined area which may be considered to be made up of individual blocks in a pattern of seven horizontal rows and five vertical columns and in which a shaded square will appear on the cathode ray tube as a white dot in a pattern determined by the address. By way of example, as the above address is applied to the memory, the word "11111" would be read out indicating that the top line is comprised of all black squares or dots as shown in FIG. 2. In the same way, 1000101,001 (where the comma has no real significance but rather designates the separation between the ASCII code and the line number) would read out "1000," indicating that the second line has a black square or dot in the first element and all elements thereafter are white.

Heretofore, using a conventional 5 × 7 format, the resolution of the alpha-numerical characters has not been particularly satisfactory. This is best illustrated by reference to FIG. 3 where the letter "S" is reproduced in a 5 × 7 conventional format. It will be noted that the letter is made up of a plurality of black squares arranged in the letter "S" pattern, but the resolution is quite rough and the letter could easily be confused with a similar character such as the number "8" or the letter "B," for example. In addition, to avoid objectional flicker in the cathode ray tube display, it is customary to have the horizontal components of the characters at least two lines wide. The reason for this is because of the 2:1 interlace, which is standard, and because the eye is sensitive to flicker at different rates depending on the area involved. In particular, for a larger area comprising several resolution elements, if the line goes on and off at a 30 cycle rate it would be annoying to most viewers. However, if two lines adjacent to each other alternatively turn on and off, no larger area flicker will exist and an effective flicker rate for the large area becomes twice the previous rate or in an EIA standard display, a large area flicker rate of 60 cycles per second is achieved which will not be objectionable or even noticeable to a large majority of viewers.

In summary, the prior art technique is to use a repeat field where each line of a character is reproduced twice to give a 5 × 7 appearance to the character even though 14 lines are used in reproducing the character.

With the present invention, alpha-numerical characters are reproduced with higher resolution, better shape and without large area flicker in a 2:1 interlaced system. Also with the present invention a 5 × 7 memory may be used to achieve the same results as a 10 × 14 character display thereby achieving a 4:1 reduction in storage requirements of a read-only memory.

In accordance with the invention, it has been found that an exact repeat field is not necessary in order to avoid flicker, but that the flicker can be avoided if the two duplicate lines which make up segments of the character are not used in exact superimposed relation as in the repeat field technique but rather, if the two lines are made to differ spatially from one another to a slight extent, and as long as the differences are limited to a relatively few elements, no large area flicker will occur and the resulting alpha-numerical characters will have much better shape and resolution.

Figure 3:
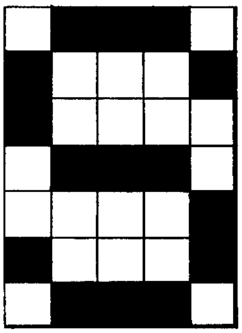
FIG. 3 shows the letter "S" in a conventional 5 × 7 display pattern.
Figure 4:
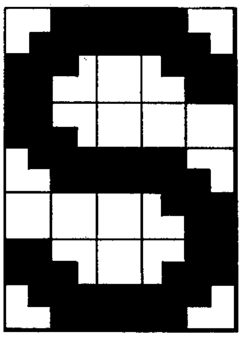
FIG. 4 shows the letter "S" as produced by the present invention.

By way of example, the letter "S" generated by a 10 × 14 repeat field technique would appear as shown in FIG. 3 whereas with a few changed added between lines, great improvement in appearance will result as shown in FIG. 4. In FIG. 4, one-half of a square of the grid represents a single line. In FIG. 4, no large area flicker would be present in a 2:1 interlace system for the reason that the flicker rate would be at 60 cycles even though each frame is reproduced at a 30 cycle rate. This happens because each line differs relatively little from the adjacent line.

The alpha-numerical characters which are reproduced on the face of the cathode ray tube may be stored in a conventional manner in a read-only memory, in which case 140 bits would have to be stored for each character. In another embodiment of the invention the memory requirements are substantially reduced and it is necessary to store only 35 bits associated with the 5 × 7 memory for each character. By the use of special logic circuitry information in the 5 × 7 memory may be processed to produce alpha-numerical characters of higher resolution and comparable to those generated by a 10 × 14 memory.

Figure 5:
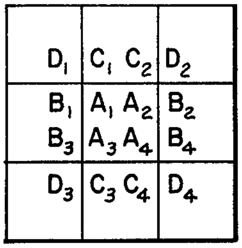
FIG. 5 shows a coded pattern for explanatory purposes.
Figure 7:
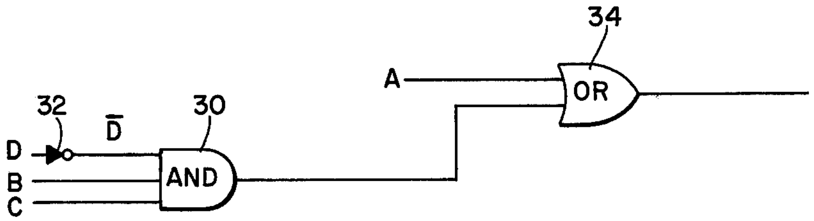
FIG. 7 shows a detail of a logical diagram employed in the invention.

Referring now to FIG. 5 of the drawings where there is shown in enlarged detail, a grid pattern, logically labeled, of a section of a raster for use in describing the results of the logic circuitry shown in FIG. 7. This circuitry includes an AND gate 30 receiving three inputs from the read-only memory 16, these signals corresponding to grid portions of an alpha-numeric character being generated on the tube 10. These portions of the character are identified on the grid by the letters A, B, C and D having corresponding signals delivered from the memory 16. As shown, the signals corresponding to the B, C and D portions of the character are fed into the AND gate 30, the D signal being first inverted by an inverter 32. The output of the AND gate 30 is to an OR gate 34 which also has an input corresponding to the A portion of the character. The logic circuit thus may be expressed as $A + B \cdot C \cdot \overline{D}$.

The circuit performs the function that the output is 1 is square A is 1 or if square B and C are both 1 and square D is 0. In this logic, each of the 10 × 14 squares corresponds to one fourth of a 5 × 7 square; A represents the 5 × 7 square within which the unknown square falls; B represents the horizontally adjacent 5 × 7 square; C represents the vertically adjacent 5 × 7 square; and D represents the diagonally adjacent 5 × 7 square.

Figure 6:
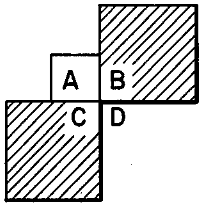
FIG. 6 shows a section of a pattern, also for explanatory purposes.

For example, referring to the letter "S" in FIG. 4, all of the black full squares correspond to the 5 × 7 black squares of FIG. 3 since A is black. In addition, the lower right-hand quarter of the upper left-hand square is black because, even though the corresponding 5 × 7 square is not black ($\overline{A}$), the horizontally adjacent and vertically adjacent 5 × 7 squares are black and the diagonally adjacent square is not black. The configuration thus is as shown in FIG. 6 and the logical diagram is as shown in FIG. 7.

Selection of the B, C and D bits is accomplished using the numbers and bit numbers;

A is the 5 × 7 square corresponding to dropping the low order bit from the bit number and the line number.

The line number of B is the same as A.

If the unknown bit number is even, the bit number of the B is the same as A minus 1.

If the unknown bit number is odd, the bit number of B is the same as A plus 1.

The bit number of C is the same as A.

If the least significant bit of the line number if 0, the line number of C is the same as A minus 1.

If the least significant bit of the line number is 1, then the line number of C is the same as A plus 1.

The bit number of D is the same as B, and the line number of D is the same as C.

It will thus be understood that by using the logic circuitry as specified a character of improved resolution can be achieved using a low storage memory.

Figure 8:
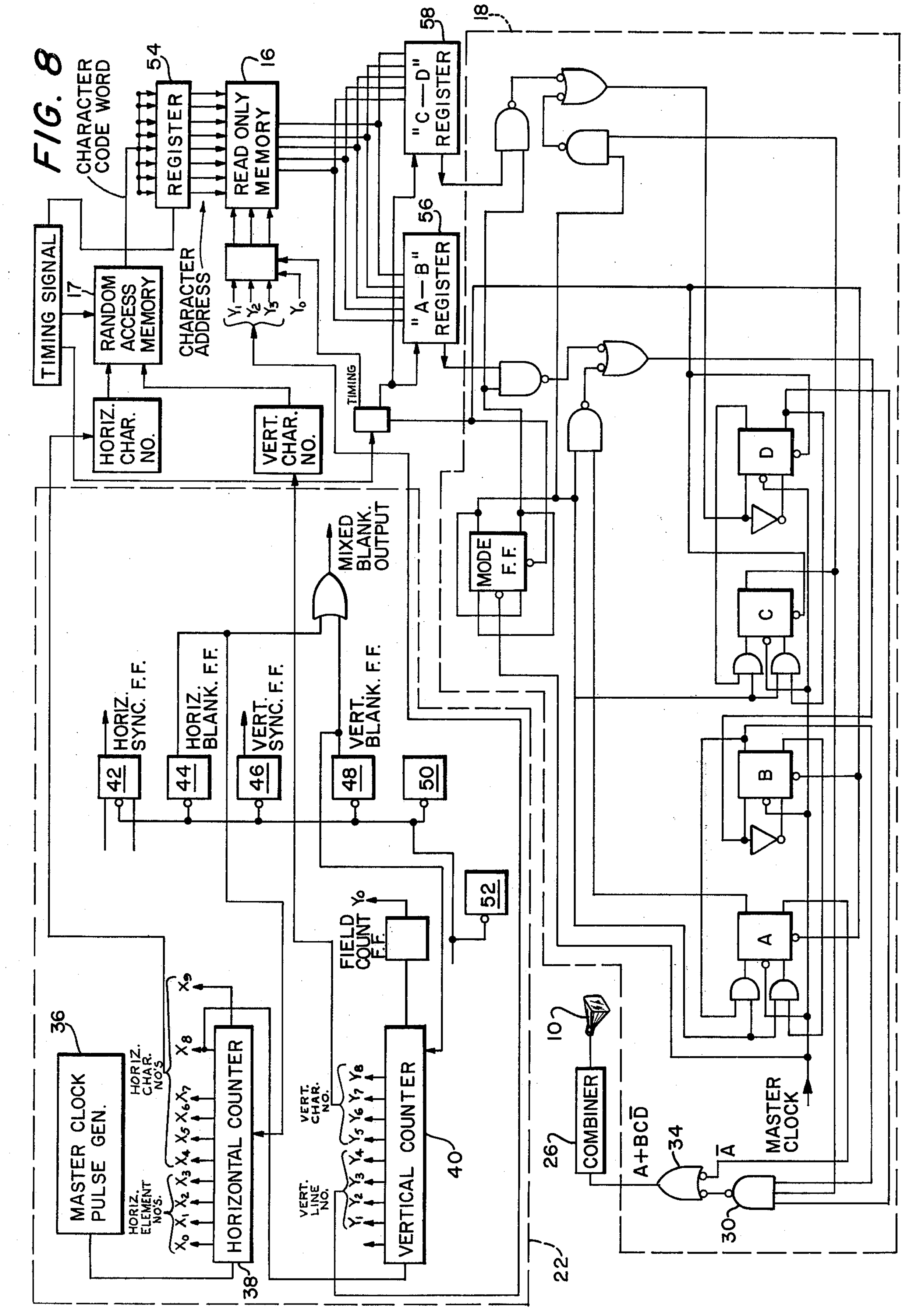
FIG. 8 is a diagram of the logic circuit employed in the system.

A more complete embodiment of the circuitry used in the system is shown in FIG. 8. As shown, a master clock oscillator 36 generates the frequency corresponding to each individual element of a picture. For a television picture, using conventional EIA standards, there are 525 lines in a picture. However, only 490, approximately, are active scan lines and the rest are for retrace purposes. In this standard television picture, approximately 53 microseconds are used for the horizontal scan. If 1024 elements are displayed across the line, then the master clock oscillator 36 has to operate at a pulse repetition rate to give an element interval of 51 nanoseconds. This master clock oscillator is fed into a horizontal counter 38, which is a binary counter ten bits long. For purposes of this description, it is assumed an array such that 64 characters are displayed across the screen, where each character occupies 16 horizontal elements. Of these horizontal elements, ten are used in the actual picture and six are blank. This arrangement is purely for convenience in the logical circuitry as shown, and can be modified to give a more pleasing spacing between characters and also between lines. With this arrangement, the horizontal element number is given by the first four bits; X0, X1, X2 and X3, whereas the horizontal character number, describing the number of the character as the line is read across, is given by bits number X4, X5, X6, X7, and X8 and X9. Six bits are required, these six bits then permit the display at 64 characters. The output from the 10th bit, X9, of course, will change only once per line. Hence for the normal interlaced scan EIA television standards, bit number X8 is fed into a vertical counter 40 which then proceeds to divide by 525.

The functions associated with the synchronizing signal, a horizontal sync flip flop 42, a horizontal blanking flip flop 44, a vertical sync flip flop 46, a vertical blanking flip flop 48, an equalizing pulse enable flip flop 50, and a vertical sync enable flip flop 52 are driven from logical combinations of the horizontal and vertical output signals. For example, the horizontal blanking flip flop 44 will be set by a count of 1023 from the horizontal counter 38. It will reset on the combined occurence of horizontal blanking and a count of 203. Similar numbers can easily be derived for the other flip flop. The vertical counter 40 output again is arranged in binary format, and the conversion to another line number, or number of characters, or another arrangement in spacing can be easily made by those skilled in the art.

In this case, for simplification, the vertical line number in any one character consists of Y1, Y2, Y3, Y4, and Y0, where Y0 is the field counter output. This assumes a normal interlaced scan raster where all of the odd lines are scanned: line 1, 3, 5, 7, 9 and so forth, then all the even lines are scanned, in the successive field, the two fields making up the one raster. In this case, the vertical line number within a character is given by one of 32 numbers, where only 14 lines are used to display the character, and 18 lines are blanks for spacing. The vertical character number in the array is given by the last four bits: Y5, Y6, Y7, and Y8.

The output of the horizontal sync flip flop 42 and the vertical sync flip flop 46 are "OR" ed together to give the mixed sync output. Similarly the horizontal blanking and vertical blanking are "OR" ed together to give the mixed blanking output.

In a conventional scan sytem, the horizontal character number and the vertical character number are used to address a random access memory. For timing purposes, and in order to be able to access the memory, it is desirable to start one character early for this purpose. This can be accomplished by adding one to X4, X5, X6, X7, X8, and X9. These numbers then are fed into the address inputs, together with the appropriate timing signals, of the random access memory 17. When the timing signals indicate that the data is available, the character code word corresponding to the character stored stored is read out. It will be understood that the input output interface of a system such as this involves other signals to address the random access memory 17 and write into it appropriate information. This is not considered part of this invention.

Figure 11:
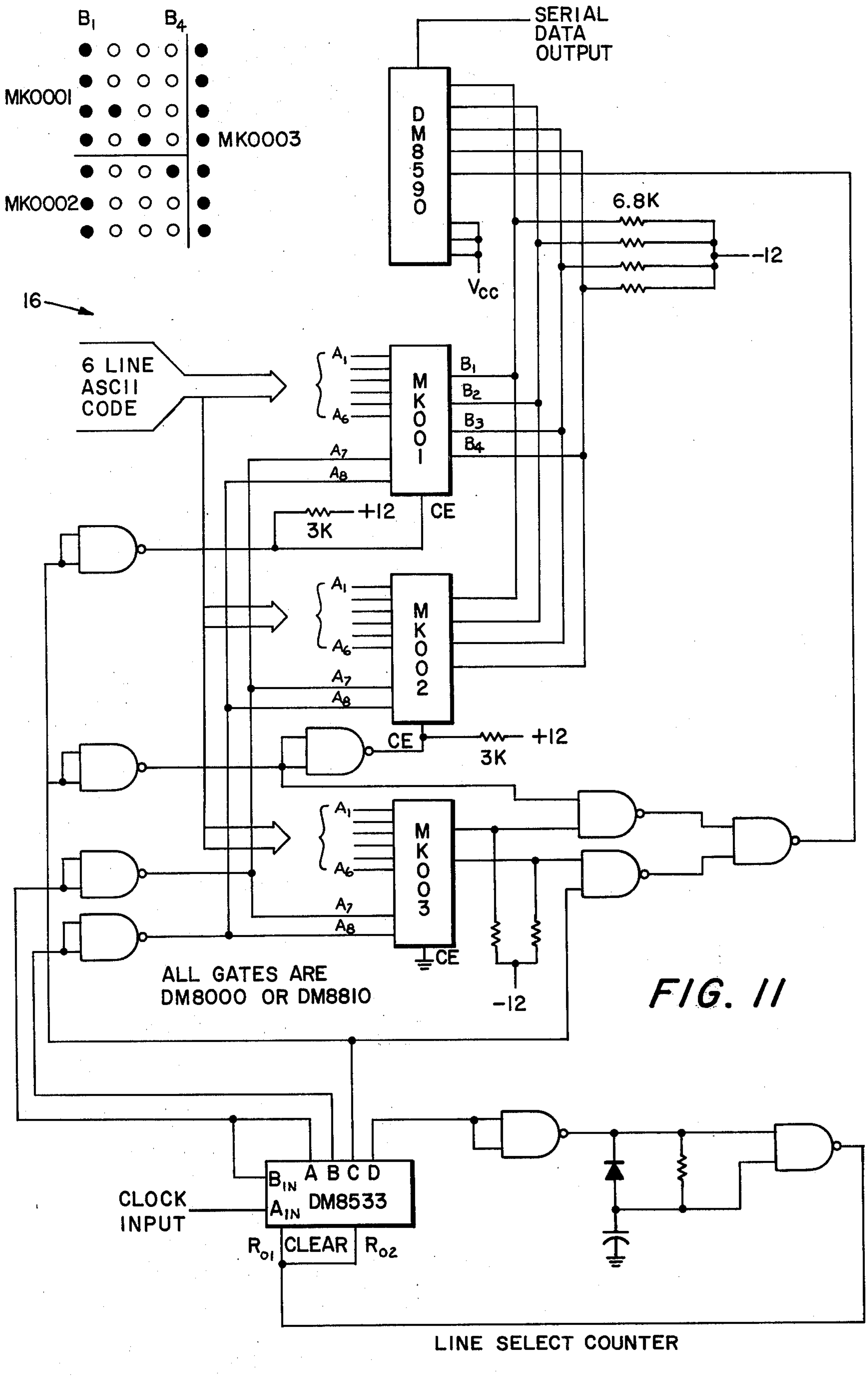

The output from the random access memory 17 consists of a character code word, for example, eight bit ASCII code might be used. These eight bits are stored in a register 54 under command of a "load" signal which is controlled by the timing net work and occurs at the time such data is available, enough ahead of the character scan time to permit operation. The character address and the line number address are fed into the read only memory 16, which for this purpose is assumed to be a row output character font memory similar to National Semiconductor type SK0001, or National Semiconductor NM5240, as shown in FIG. 11, modified to be sufficiently fast to permit operation in this system. The output of the character code word from the storage register 54 is used to address the read-only memory 16. A line number address is also derived from signals Y1, Y2, and Y3 from the counter 40 modified as required by the operation of this invention. The row output character font is addressed alternately with the "AB" signals and the "CD" signals, where the "ABCD" letters correspond to the algorithm A or (B and C and not D). The operation of this circuitry will be described below.

Figure 9:
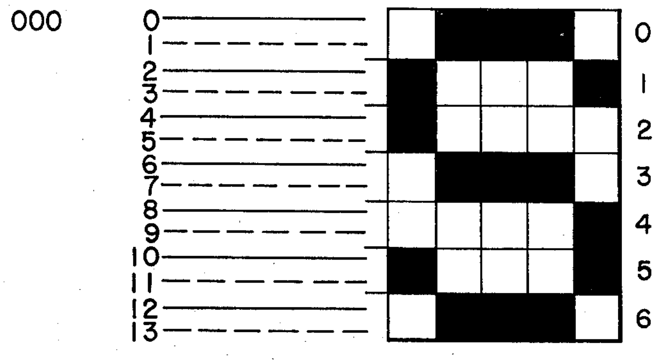
FIG. 9 is an explanatory presentation of line number addressing.

An examination of FIG. 9 demonstrates how the line number address needs to be modified depending on which field is being scanned. Numbering the elements rows vertically in the letter 0123456 and assuming two scan lines for each character row, the even field will scan line 0, 2, 4, 6 and so forth. The odd field will scan lines 1, 3, 5, 7, and so forth until the entire character is scanned. For the even field, the binary address corresponding to line 0 is 0000. Hence the address for the line feed into an AB register 56 requires no modification, and of course, a blank line needs to be fed into a CD register 58. For a typical even line, it is merely necessary to drop the field bit (not include it in the address) and use the three next least significant bits, Y1, Y2, and Y3 to address the line for the AB register 56. For the CD register, it is necessary to subtract one from the number for the AB register 56. Accordingly, the modification circuit will count down by one to address the read-only memory 16 for the CD register 56 on the even field. On the odd field, examination would show that addresses for the AB register 56 again are formed by merely dropping the last bit and using Y1, Y2, and Y3 for the address. However, in this case the CD register address comes from adding one to the AB register address. Hence the modification on an odd field consists of adding one to load the CD register 58.

Figure 10:
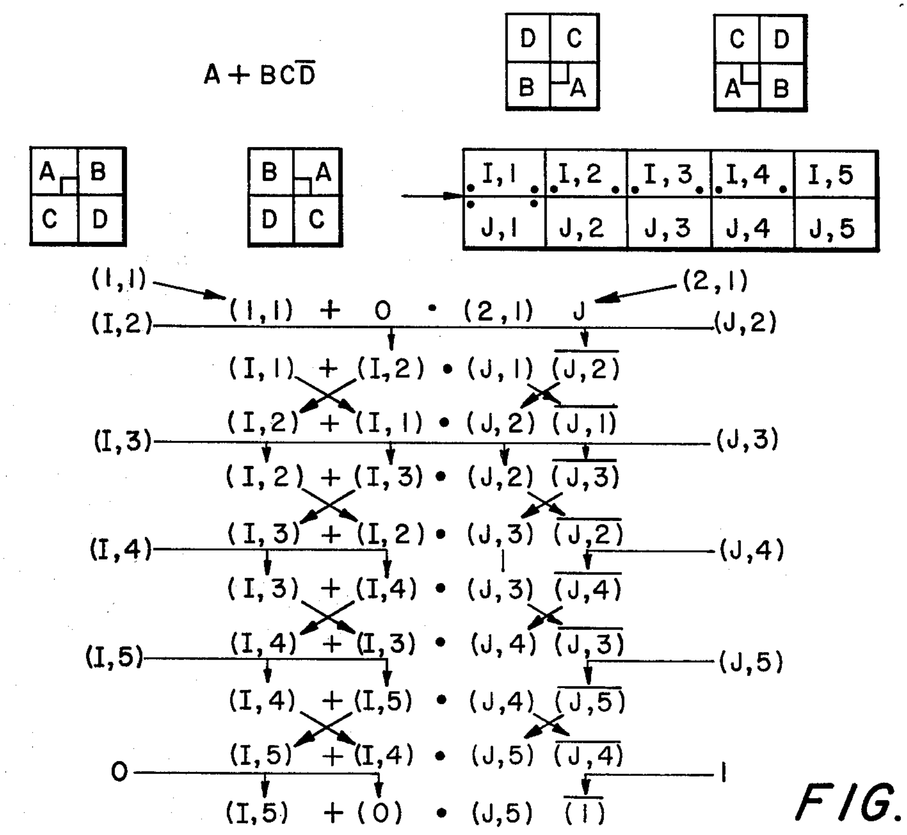
FIG. 10 is a graphical and logical demonstration of the operation of the system, and, FIG. 11 is a logic diagram of a read-only memory.

Referring now to FIG. 10 assume a scan across line number I, with line number J adjacent to it, where line I corresponds to AB elements and line number J corresponds to the CD elements. Considering each horizontal element in turn, for the first element, the $A \times BC\overline{D}$ logical equation would involve I1 and J1; since the adjacent "B" and "D" element next to it is blank. Applying $A \times BC\overline{D}$ to the second element scanned, it is seen that the equation requires element I1 or element I2 and element J1 and not element J2. Proceeding across the scan line as shown it is seen that the steps consist of loading B and D, then for the next character, interchanging A and B and interchanging C and D, followed by the next element by new load into B and D. This carries on until the last elemet is reached. Of course for the last element, it is necessary to load a 0 into the B flip flop. The logical circuit arrangement required is shown in FIG. 8. Here the AB register 56 will load flip flop B and the CD register will load flip flop D on every other element. On the following element, flip flop A and B interchange as do flip flop C and D. This operates under control of the master clock which clocks each element. The output signal then goes to the and-or network described earlier, and thence to the video output.

Having thus described the invention what I claim and desire to obtain by Letters Patent of the United States is:

1. A system for displaying high resolution alpha-numeric characters each in a grid pattern of selectively illuminated spots of large and small elements, comprising a. a cathode ray tube, b. memory means including a fixed storage portion and a variable portion connected to said tube for storing encoded alpha-numeric characters in a grid pattern, c. input means connected to the variable portion of said memory means for feeding input information into said system, d. driving means connected to said memory means and said tube for generating a slightly displaced double raster grid matrix on said tube, e. timing means connected to said memory means and said driving means for cyclically repeating the output of said memory means in synchronism with said driving means, f. the fixed storage portion of said memory means storing encoded versions of said alpha-numeric characters in essentially a single grid element width format, and g. pattern control means connected to said memory and driving means to receive inputs therefrom for modifying the generated character of one raster with respect to the same character of the other raster;

h. said pattern control means including logic circuitry connected between said memory means and said tube, said circuitry including gates receiving input signals from said memory with respect to large elements of each character being generated and adapted to produce a small element output signal to modify said character upon the occurrence of a predetermined combination of signals, i. said gates including an OR gate, and AND gate and an inverter receiving signals in one of two possible states with respect to an unknown portion of said character and providing an output of said tube, j. said gates and inverter connected in parallel with one of said gates being an output gate, said output gate connected to receive two input signals one of which corresponds to a grid area within which an unknown area fails, and the other of which is the output of said gates and inverter, said other gates and inverter connected to receive at least three other signals corresponding to other parts of said grid pattern, k. said circuitry expressing the algorithm $A + (B \cdot C \cdot \overline{D})$ and the logical equivalents thereof where A represents a signal corresponding to a grid area within an unknown area falls, B represents a signal corresponding to a horizontally adjacent area, C represents a signal corresponding to a vertically adjacent area, D represents a signal corresponding to a diagonally adjacent area and $\overline{D}$ represents the inversion of the signal D.

2. A system according to claim 1 wherein said input means includes a keyboard connected to said system for inserting signals therein.

3. A circuit for storing information for use in a display system, comprising a. a read-only memory adapted to store digitally encoded alpha-numerical characters and symbols in a grid pattern of relatively large elements of low resolution, b. address input means connected to said memory to selectively read data stored therein, c. pattern control means connected to said memory and adapted to generate relatively small elements and additional data which combined with said memory data corresponds to digitally encoded alpha-numeric characters in high resolution for use in said display system, d. said pattern control means including an OR gate, an AND gate and an inverter receiving signals in one of two possible states with respect to an unknown portion of said character and providing an output to said display system, e. said gates and inverter connected in parallel with one of said gates being an output gate, said output gate connected to receive two input signals one of which corresponds to a grid area within an unknown area falls and the other of which is the output of the other of said gates and inverter, said other gates and inverter connected to receive at least three other signals corresponding to other parts of said grid pattern, f. said circuitry expressing the algorithm $A + (B \cdot C \cdot \overline{D})$ and the logical equivalents thereof where A represents a signal corresponding to a grid area within which an unknown area falls, B represents a signal corresponding to a horizontally adjacent area, C represents a signal corresponding to a vertically adjacent area, D represents a signal corresponding to a diagonally adjacent area and $\overline{D}$ represents the inversion of the signal D.

* * * * *